(12) United States Patent
Inagaki

(10) Patent No.: US 8,090,397 B2
(45) Date of Patent: Jan. 3, 2012

(54) GROUP COMMUNICATION METHOD AND COMMUNICATION TERMINAL

(75) Inventor: Tomohiro Inagaki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 482 days.

(21) Appl. No.: 12/297,191

(22) PCT Filed: Mar. 29, 2007

(86) PCT No.: PCT/JP2007/056835
§ 371 (c)(1),
(2), (4) Date: Jun. 3, 2009

(87) PCT Pub. No.: WO2007/119586
PCT Pub. Date: Oct. 25, 2007

(65) Prior Publication Data
US 2010/0016006 A1    Jan. 21, 2010

(30) Foreign Application Priority Data
Apr. 13, 2006    (JP) .................. 2006-110939

(51) Int. Cl.
*H04M 3/42* (2006.01)
*H04B 7/00* (2006.01)
*H04W 4/00* (2009.01)

(52) U.S. Cl. ......... 455/518; 455/517; 455/519; 455/416

(58) Field of Classification Search .................. 455/518, 455/519, 517, 521, 416
See application file for complete search history.

(56) References Cited

U.S. PATENT DOCUMENTS

| | | | |
|---|---|---|---|
| 6,996,414 B2* | 2/2006 | Vishwanathan et al. ....... | 455/518 |
| 7,277,697 B2* | 10/2007 | Desai et al. .................... | 455/416 |
| 7,804,944 B2* | 9/2010 | Pines et al. ................ | 379/114.01 |
| 7,818,020 B1* | 10/2010 | Manroa et al. ................. | 455/519 |
| 2003/0154249 A1 | 8/2003 | Crockett et al. | |

FOREIGN PATENT DOCUMENTS

| | | |
|---|---|---|
| JP | 06-141084 | 5/1994 |
| JP | 2003-174520 | 6/2003 |
| JP | 2005-522067 | 7/2005 |
| KR | 2004077965 A | 9/2004 |
| KR | 20060014620 A | 1/2006 |
| WO | 03069926 A1 | 8/2003 |

OTHER PUBLICATIONS

Toriatsukai Setsumeisho FOMA D902i, NTT DoCoMo Group, second edition, Nov. 2005, pp. 91-100.
English language translation of Korean office action dated Aug. 20, 2010 for corresponding Korean application 1020087027673 lists the references above.

* cited by examiner

*Primary Examiner* — Tilahun B Gesesse
(74) *Attorney, Agent, or Firm* — DLA Piper LLP (US)

(57) ABSTRACT

A group communication method in which a communication terminal not participating in the group communication can newly participate in the group communication even while the group communication is being carried out is realized. The group communication method has a personal information management step of managing personal information, a participation request transmission step, a group communication control step, and an other party updating step, in a case where participation intention in the group communication is received from another communication terminal to which no participation request has been transmitted in a state of "party not participating" in which at least one party among the plurality of terminals of the parties sent the participation requests does not participate in the group communication, deleting the party not participating in the group communication from a member list and registering the other party of the other communication terminal in the member list as a party for engaging in the group communication to thereby allow the other communication terminal to participate in the group communication.

10 Claims, 4 Drawing Sheets

FIG. 4A

| MEMBER | STATE | |
|---|---|---|
| B | STANDING BY | ~109 |
| C | STANDING BY | |
| D | STANDING BY | |
| E | STANDING BY | |
| — | — | |

FIG. 4B

| MEMBER | STATE | |
|---|---|---|
| B | PARTICIPATING | ~109 |
| C | PARTICIPATING | |
| D | PARTICIPATING | |
| E | STANDING BY | |
| — | — | |

FIG. 4C

| MEMBER | STATE | |
|---|---|---|
| B | PARTICIPATING | ~109 |
| C | PARTICIPATING | |
| D | PARTICIPATING | |
| E | DELETE | |
| F | STANDING BY | |

FIG. 4D

| MEMBER | STATE | |
|---|---|---|
| B | PARTICIPATING | ~109 |
| C | PARTICIPATING | |
| D | PARTICIPATING | |
| F | PARTICIPATING | |

GROUP COMMUNICATION METHOD AND COMMUNICATION TERMINAL

A CROSS REFERENCE OF FOREIGN PRIORITY DOCUMENT

This application has a Japan priority document 2006-110939 filed on Apr. 13, 2006.

TECHNICAL FIELD

The present invention relates to a PTT (push to talk) or other group communication method and a communication terminal.

BACKGROUND ART

In recent years, the types of communication of phones have become more diverse. In addition to the conventional speech communication by line switching, phones capable of performing packet communications utilizing an IP (internet protocol) network are widely utilized. For example, "chat mail" where mobile phones trade text in real time for conversion is known (see Patent Document 1). Chat mail is one of the modes of communication called "group communication" where members registered in advance form a group and trade text and other data in real time in the group.

Further, as one of the types of group communications attracting attention recently, the one called PTT (push to talk) or PoC (push to talk over cellular) is known. In the PTT, a plurality of communication terminals forming a group engage in speech conversation with each other in real time by VoIP (voice over Internet protocol) (see Patent Document 2).

When a plurality of communication terminals capable of group communication by PTT try to start group communication, a representative single communication terminal among the plurality of communication terminals performs processing for starting the group communication. Then, that representative single communication terminal generates a group communication start notification and sends the notification to the other communication terminals registered in that communication terminal. The "group communication start notification" is a notification whereby that representative single communication terminal inquiries to the other communication terminals about their participation in group communication.

The owners of the other communication terminals receiving the group communication start notification can determine whether or not they will participate in the group communication by using, for example, data included in the group communication start notification transmitted from the owner of representative single communication terminal as a judgment standard. Once the PTT group communication is started, the owner of any communication terminal desiring to say something can depress a predetermined button (PTT button) provided at the communication terminal to transmit a speech request of the owner to a server apparatus. The server apparatus receives the speech requests from the communication terminals and gives a right of speech to a single communication terminal. The communication terminal given the right of speech transmits speech data of the owner to the server apparatus, whereupon the server apparatus transmits that speech data to the other communication terminals all together. Due to this, speech conversation in real time is carried out by a plurality of communication terminals forming a group.

Patent Document 1: Japanese Patent Publication (A) No. 2003-174520
Patent Document 2: Japanese Patent Publication (A) No. 2005-522067

DISCLOSURE OF INVENTION

Technical Problem

When using communication terminals for group communication, there is an upper limit to the number of communication terminals able to participate in the group communication at one time. However, even if a representative single communication terminal generates a group communication start notification and sends the notification to the same number of communication terminals as the number of communication terminals able to participate in the group communication, all of the communication terminals receiving the notification will not necessarily participate in the group communication.

In that case, an empty slot arises in the number of communication terminals capable of participating in the group communication. However, in the conventional group communication by communication terminals, a communication terminal not receiving the group communication start notification cannot newly participate in the group communication even in such a case. For this reason, there is the inconvenience that the empty slot of the number of communication terminals capable of participating in the group communication cannot be effectively used.

Therefore, in the PTT (push to talk) and other group communication method, it has been desired to realize the ability of a communication terminal not participating in the group communication to newly participate in the group communication even in the middle of group communication.

Further, it has been desired to realize a communication terminal enabling a communication terminal not participating in the group communication to newly participate in the group communication even in the middle of group communication.

Technical Solution

The present invention provides a group communication method of communication terminals by which a plurality of communication terminals connected to a communication network including a communication server apparatus engage in group communication via the communication server apparatus, having: a personal information management step of managing personal information for communication terminals of a plurality of communicating parties; a participation request transmission step of registering a plurality of communication terminals for engaging in the group communication in a member list, and transmitting participation requests for the group communication to the plurality of communication terminals, when designating a plurality of communication terminals to engage in the group communication based on the plurality of personal information and starting the group communication; a group communication control step of performing processing for the group communication with communication terminals to which responds of participate with respect to the participation requests exist; a participation intention reception step of receiving intention to participate in the group communication from another communication terminal to which no participation request has been transmitted, in a state of "party not participating" in which there is at least one communication terminal among the plurality of communication terminals sent the participation requests which will not participate in the group communication; and an other party updating step of deleting any communication terminal not participating in the group communication from the member list when receiving the participation intentions in the group communication, in the participation intention reception step, and registering the other party of the other communication terminal in the member list as another party for engaging in group communication to enable the other communication terminal to participate in the group communication.

Preferably, the group communication method of the present invention further has an in-progress group communication report step of responding with a notification of in-progress group communication to another communication terminal when receiving another request of communication from the other communication terminal during the group communication, and the participation intention from the other communication terminal is received as an answer to the notification of the in-progress group communication.

Further preferably, the group communication method of the present invention further has a re-transmission step of re-transmitting a participation request to any communication terminal which did not respond to the participation request in the participation request transmission step and an in-progress communication response judgment step of judging presence/absence of a response with respect to a participation request including one re-transmitted during the group communication, and, in the in-progress communication response judgment step, a state judged as "no response" is judged as the state of "party not participating" in the other party updating step.

Further preferably, the group communication method of the present invention has an update notification step of notifying updating of the member list to the communication terminals participating in the group communication when the other party updating step is executed.

Further preferably, in the group communication method of the present invention, the group communication has an upper limit in the number of communication terminals capable of participating in the group communication, and the other party updating step is executed in a case where the number of communication terminals participating in the group communication has become the upper limit.

Further, the present invention provides a group communication terminal having a communication part for engaging in group communication via a communication server apparatus with a plurality of communication terminals connected to a communication network including the communication server apparatus, having a personal information management part managing personal information of the plurality of communication terminals and a group communication control part registering a plurality of other parties engaging in the group communication in a member list and making the communication part transmit participation requests for group communication to the plurality of communication terminals when designating the plurality of communication terminals to engage in the group communication based on the plurality of personal information and starting the group communication by the communication part, wherein when the communication part receives participation intention in the group communication from another communication terminal to which no participation request has been transmitted in the state of "party not participating" in which at least one communication terminal among the plurality of communication terminals sent the participation requests does not participate in the group communication, the group communication control part deletes the at least one party of communication from the member list and registers the other communication terminal as a communication terminal to engage in the group communication in the member list and thereby allows the other communication terminal to participate in the group communication.

Effect of the Invention

In the group communication method of the present invention, a communication terminal which has not participated in a group communication can newly participate in the group communication even while group communication is being carried out. Further, the communication terminal of the present invention can newly participate in a group communication even when that communication terminal does not first participate in the group communication while the group communication is being carried out.

BRIEF DESCRIPTION OF THE DRAWINGS

FIG. 4 shows a state of registration of a member list of a host communication terminal used in the communication method according to the present embodiment.

EXPLANATION OF NOTATIONS

101 . . . antenna, 102 . . . communication part, 103 . . . key input part, 104 . . . speech processing part, 105 . . . speaker, 106 . . . microphone, 107 . . . display portion, 108 . . . memory part, 109 . . . member list, 110 . . . control part, 100, 100-1 to 100-5 . . . communication terminals, 200 . . . communication server apparatus, and 300 . . . communication network.

BEST MODE FOR CARRYING OUT THE INVENTION

Figure 1:
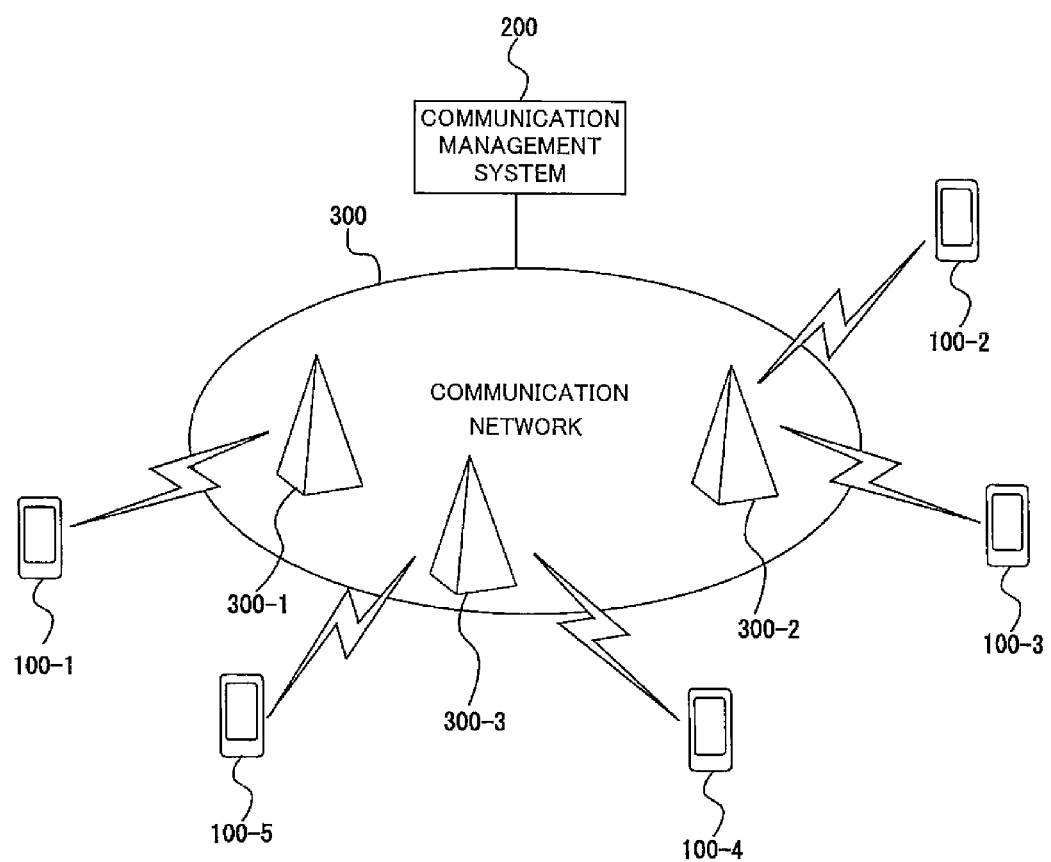
FIG. 1 shows an example of the configuration of a communication system used in a communication method according to an embodiment of the present invention.

FIG. 1 is a diagram showing an example of the configuration of a communication system used in a communication method according to an embodiment of the present invention.

The communication system used in the communication method according to the present embodiment, for example, as shown in FIG. 1, has communication terminals 100-1 to 100-5 and a communication server apparatus 200.

A communication terminal 100-$i$ ($i$ is an integer of 1 to 5) is a wireless communication terminal, for example, a mobile phone, and is connected to a communication network 300 via base stations (300-1, 300-2, 300-3). Further, the communication terminal 100-$i$ performs data communication under the control of the communication server apparatus 200 connected to the communication network 300. In the present embodiment, as an example, PTT (push to talk) group communication (below sometimes called just "group communication") is carried out. Data transmitted in the group communication includes, for example, speech conversation, images, text, music, and other data.

Among the communication terminals 100-$i$, a representative one among the plurality of communication terminals 100-$i$ starting the group communication when engaging in the group communication becomes the host device (hereinafter sometimes called the "host communication terminal"), while the others become devices participating in the group communication by receiving the group communication start notification (below sometimes called the "participant communication terminals").

<Case of Operation as Host Communication Terminal>

When a terminal starts the group communication as the host communication terminal, the communication terminal 100-$i$ encrypts the personal information of each of the other parties to which participation in the group communication is requested. This personal information includes, for example, the name and phone number of the other party and his or her e-mail address (identification information on the communication network). Such personal information is managed by the host communication terminal itself. The communication terminals of the other parties for engaging in the group communication are designated based on that managed personal information.

Further, the communication terminal 100-$i$ transmits a start request of the group communication to the communication server apparatus 200 and acquires data of the information of a group communication management use site set by the communication server apparatus 200 (network address, log-in use ID, etc.) in response to this request from the communication server apparatus 200.

Next, the communication terminal 100-$i$ transmits the group communication start notification (participation request) to the communication terminals or the other parties. Hereinafter, the communication terminals which are sent this group communication start notification will be called "members of the group communication" or simply "members".

The group communication start notification includes data of various types of information which become necessary for a participant communication terminal to participate in the group communication. For example, information of the host of the group communication (name, phone number, e-mail address etc.) and information of the group communication management use site (network address, log-in use ID, etc.) acquired from the communication server apparatus 200 are included. The communication terminal 100-$i$ transmits this group communication start notification to each member of the group communication by, for example, SMS (Short Message Service).

After that, when receiving a response indicating the participation in the group communication from at least one member, the communication terminal 100-$i$ starts the group communication with this member via the communication server apparatus 200. Here, a response indicating participation in the group communication from the member to the host can be received by, for example, a SMS in the same way as the group communication start notification.

<Case of Operation as Participant Communication Terminal>

When participating in the group communication as a participant communication terminal, a communication terminal 100-$i$ receives the group communication start notification (participation request) sent from the host communication terminal.

When receiving the group communication start notification, the communication terminal 100-$i$ reports that a group communication start notification was received to the user by a report part generating an image, light, sound, vibration, etc.

When the user confirming the personal information of the member of the group communication inputs an instruction for participation in the group communication by, for example, a key operation, the communication terminal 100-$i$ transmits a response indicating the participation in the group communication to the host communication terminal, accesses the site for the communication management based on the data of the information included in the group communication start notification, and starts the group communication as the participant communication terminal.

The communication server apparatus 200 manages the PTT group communication engaged in by the communication terminals (100-1 to 100-5).

When receiving the start request of the group communication issued from the host communication terminal, the communication server apparatus 200 (or another server apparatus on the network as well) establishes a site for the group communication management on the communication server apparatus 200. This site manages the information of each communication terminal participating in the group communication (phone number, e-mail address, etc.), enables participation and departure of each communication terminal in and from the group communication, transmits/receives data between communication terminals, gives the right of speech to a communication terminal requesting speech, and performs other various management and control concerning the group communication.

When establishing the group communication management use site in response to a start request of the group communication, the communication server apparatus 200 transmits the information of that site to the host communication terminal.

Further, when a participant communication terminal accesses the site described above, the communication server apparatus 200 permits the log-in of the participant communication terminal based on the log-in use ID provided by the participant communication terminal, the phone number of the participant communication terminal, or the like. Then, it registers the information of the newly logged-in participant communication terminal in a management table in the site. Further, it notifies that a new participant was added to the host communication terminal and participant communication terminals.

When one communication terminal participating in the group communication issues a speech request (data transmission request) by, for example, depression of the PTT button, the communication server apparatus 200 gives the right of speech (data transmission right) to this one communication terminal when there is no other communication terminal in the middle of speech (in the middle of transmitting data). Namely, the apparatus receives the data (speech conversation, text, etc.) sent from this one communication terminal and transmits this to the other participating communication terminals. When there is another communication terminal speaking, the apparatus returns a response rejecting speech to this one communication terminal. When speech requests of several communication terminals overlap, a priority order of the communication terminals is determined by a predetermined rule (for example, the priority order is set higher the smaller the number of times of speech of a terminal), and the right of speech is sequentially given to the communication terminals based on this.

When receiving an end request of the group communication issued by the host communication terminal, the communication server apparatus 200 transmits an end notification of the group communication to each of the participant communication terminals and ends the group communication.

The communication server apparatus 200 manages the PTT group communication performed by the communication terminals (100-1 to 100-5).

When receiving a start request of the group communication issued from the host communication terminal, the communication server apparatus 200 establishes a site for the group communication management in the communication server apparatus 200 (or another server apparatus on the network). This site manages the information of each communication terminal participating in the group communication (phone number, e-mail address, etc.), enables participation and departure of each communication terminal in and from the group communication, transmits/receives data between communication terminals, gives the right of speech to a communication terminal requesting speech, and performs other various management and control concerning the group communication.

When establishing the group communication management use site in response to the start request of the group communication, the communication server apparatus 200 transmits the information of that site to the host communication terminal.

Further, when a participant communication terminal accesses the site described above, the communication server apparatus 200 permits the log-in of the participant communication terminal based on the log-in use ID provided by the participant communication terminal, the phone number of the participant communication terminal, or the like. Then, the apparatus registers the information of the newly logged-in participant communication terminal in a management table in the site. Further, the apparatus notifies that a new participant was added to the host communication terminal and participant communication terminals.

When one communication terminal participating in the group communication issues a speech request (data transmission request) by, for example, depression of the PTT button, the communication server apparatus 200 gives the right of speech (data transmission right) to this one communication terminal when there is no other communication terminal in the middle of speech (in the middle of transmitting data). Namely, the apparatus receives the data (speech conversation, text, etc.) sent from this one communication terminal and transmits this to the other participating communication terminals. When there is another communication terminal speaking, the apparatus returns a response rejecting speech to this one communication terminal. When speech requests of several communication terminals overlap, a priority order of the communication terminals is determined by a predetermined rule (for example, the priority order is set higher the smaller the number of times of speech of a terminal), and the right of speech is sequentially given to the communication terminals based on this.

When receiving an end request of the group communication issued by the host communication terminal, the communication server apparatus 200 transmits an end notification of the group communication to each of the participant communication terminals and ends the group communication.

Next, an example of the configuration of the communication terminal will be explained.

Figure 2:
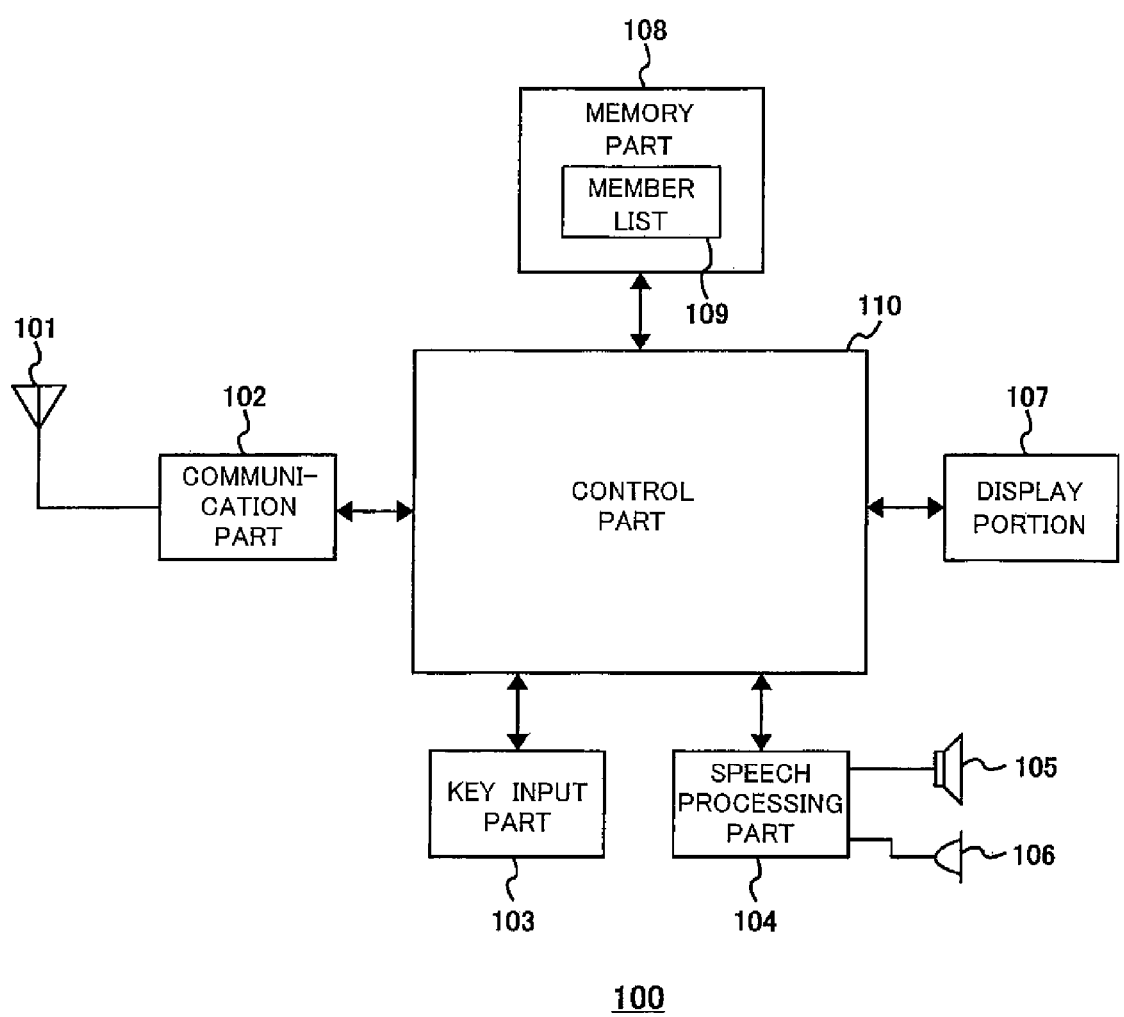
FIG. 2 shows an example of the configuration of a communication terminal according to an embodiment of the present invention.

FIG. 2 is a diagram showing an example of the configuration of the communication terminals (100-1 to 100-5) according to an embodiment of the present invention. Below, communication terminals having the configuration shown in FIG. 2 will be sometimes called the "communication terminal 100" all together. The communication terminal 100 shown in FIG. 2 has an antenna 101, a communication part 102, a key input part 103, a speech processing part 104, a speaker 105, a microphone 106, a display portion 107, a memory part 108, and a control part 110.

The communication part 102 performs wireless communication with base stations (300-1, 300-2, 300-3) connected to the communication network 300. For example, the communication part 102 applies a predetermined modulation processing to transmission data supplied from the control part 110 to converts this to a wireless signal which it then transmits from the antenna 101. Further, the communication part applies a predetermined demodulation processing to the wireless signal from a base station received at the antenna 101 to convert this to reception data which it outputs to the control part 110.

The key input part 103 has keys to which various functions (roles) are assigned, for example, a power key turning the power on or off, a speech key instructing start/end of speech, numerical keys, letter keys, direction keys, an execute key, and a PTT button. When these keys are operated by the user, they generate signals corresponding to operation contents. These are inputs as the instructions of the user to the control part 110.

The speech processing part 104 performs the processing of an audio signal output at the speaker 105 and an audio signal input at the microphone 106. Namely, the speech processing part applies amplification, analog-to-digital conversion, encoding, or other signal processing to the audio signal input from the microphone 106, converts this to digital audio data, and outputs this to the control part 110. Further, the speech processing part applies decoding, digital-to-analog conversion, amplification, or other signal processing to the audio data supplied from the control part 110, converts this to an analog audio signal, and outputs this to the speaker 105.

The display portion 107 is configured by using a display device, for example, a liquid crystal display panel or organic EL panel, and displays images in accordance with video signals supplied from the control part 110. For example, the display portion displays the phone number of the destination of transmission at the time of transmission, the phone number of the other party of reception at the time of reception, contents of received mail and sent mail, the date, time, the remaining amount of battery life, a waiting screen, and other various types of information and images.

The memory part 108 stores various types of data utilized in the processing at the control part 110. For example, the memory part holds programs of a computer provided in the control part 110, an address book managing the phone numbers and e-mail addresses and other personal information of other parties in the communication, an audio file for playing an incoming call sound or alarm sound, various types of setup data, temporary data utilized in the processing step of the programs, and so on.

Further, the memory part 108 includes a member list 109. When the communication terminal 100 shown in FIG. 2 becomes the host communication terminal, the other parties of the participant communication terminals to engaged in the group communication are registered in the member list 109 and stored when about to perform the group communication.

Further, the memory part 108 is configured by, for example, a non-volatile memory device (non-volatile semiconductor memory, hard disc device, optical disc device, etc.), a random accessible memory device (for example, an SRAM or DRAM), or the like.

The control part 110 centrally controls the entire operation of the communication terminal 100. Namely, the control part controls the operations of the units explained above (transmission/reception of signals at the communication part 102, input/output of speech at the speech processing part 104, display of images on the display portion 107, etc.) so that various types of processing of the communication terminal 100 (speech conversation performed via the line switching network, PTT group communication, preparation and transmission/reception of e-mails, browsing of web sites of Internet, etc.) are executed in a suitable sequence in accordance with the operation of the key input part 103.

For example, the control part 110 is provided with a computer executing the processing based on the programs (operating system, applications, etc.) stored in the memory part 108 and executes the processing explained above according to the sequence instructed by the programs.

(1) The control part 110 performs the following processing when holding group communication as the host communication terminal.

First, the control part 110 determines the members of the group communication. The members of this group communication are selected, for example, from among the other parties of communication registered in the address book of the memory part 108.

When explaining one example, where an instruction is input at the key input part 103 so as to holding group communication as the host communication terminal, the control part 110 displays a table of the other parties of the communication registered in the address book of the memory part 108 on the display portion 107 and inputs an instruction for selecting members of the group communication from this table from the key input part 103.

Further, when the memory part 108 stores several groups of other parties of communication selected in advance and holding group communication as the host communication terminal, one of the groups stored in the memory part 108 may also be selected and determined as the member of the group communication in response to an instruction from the key input part 103. Alternatively, members of the group communication may be determined by directly inputting the identification information (phone numbers, e-mail addresses, etc.) of the other parties by the numerical keys and letters key of the key input part 103.

The above address book and information regarding the group are stored as the personal information in the memory part 108. Further, the control part 110 functions as the personal information management part and manages the personal information by changing the memory content and data structure in the memory part 108.

When the control part 110 determines members to engage in the group communication in this way, the control part 110 registers those members in the member list 109 of the memory part 108. When the host communication terminal tries to perform the group communication, a start request of the group communication is issued to the other parties (communication terminals) registered in this member list 109.

When the control part 110 requests start of the group communication, the control part transmits a start request from the communication part 102 to the communication server apparatus 200 and receives the data of the information sent from the communication server apparatus 200 at the communication part 102 in response to this start request. The data of this information includes information for starting the group communication. For example, the data includes a network address of the group communication management use site, its log-in use ID, etc. The control part 110 generates the group communication start notification by using the data of the information acquired from the communication server apparatus 200 and transmits the data of this information from the communication part 102 to each of the members of the group communication.

When a response indicating participation in the group communication is returned from a member with respect to the group communication request, and this is received at the communication part 102, the control part 110 starts the PTT data transmission/reception processing (group communication). Note that the start request of the group communication is sent to all of the other parties registered in the member list 109, but not all of the other parties will return a response indicating participation in the group communication.

When the speech key of the key input part 103 is depressed, the control part 110 transmits a speech request from the communication part 102 to the communication server apparatus 200. When notification of permission with respect to this speech request is received from the communication server apparatus 200 at the communication part 102, the control part 110 converts the audio signal input from the microphone 106 to speech data at the speech processing part 104 and transmits this from the communication part 102 to the communication server apparatus 200. Further, when the speech key is not depressed, the control part converts the audio data from the communication terminal in the middle of speech received at the communication part 102 to an audio signal at the speech processing part 104 and outputs the speech from the speaker 105. Other than the data of the speech conversation, the transmission/reception of various types of data such as image data and music data is carried out in the same way.

There also exists a case where a request for participation in the group communication newly occurs from a communication terminal which is not registered in the member list 109 of the host communication terminal and is not participating in the group communication while the group communication is being performed in this way. In such case, the processing for reception of a request for participation from a communication terminal not participating in the group communication is carried out by the control part 110 through the communication part 102 of the host communication terminal.

When the processing for reception is carried out for a request for participation by the control part 110, any party which did not respond to the start request of the group communication by indicating participation in the group communication among the other parties registered in the member list 109 is deleted from the registration of the member list 109.

In place of that, the other party of the communication terminal requesting the participation is registered in the member list 109 as a party for engaging in the group communication in progress at present. The group communication is carried out with the other parties registered in the member list 109 of the host communication terminal. Therefore, by the registration of the other party of the communication terminal requesting participation in the member list 109, it becomes possible to allow that communication terminal to participate in the group communication in progress at present.

(2) The control part 110 performs the following processing when engaging in group communication as the participant communication terminal.

First, the communication part 102 of the participant communication terminal receives a group communication start notification (participation request) transmitted from the communication part 102 of the host communication terminal under the control of the control part 110. Then, where the owner of the participant communication terminal want to participate in the group communication, that owner performs a predetermined operation on the key input part 103 of the participant communication terminal. When the predetermined operation is carried out on the key input part 103, the control part 110 transmits the fact that it will participate in the group communication to the host communication terminal through the communication part 102.

By performing this, the group communication is started as explained in (1). Note that sometimes a user of a predetermined communication terminal will not have been registered in the member list of the host communication terminal as a party of the group communication held by the host communication terminal. When the user of the communication terminal is not registered in the member list of the host communication terminal, that communication terminal will not receive the group communication start notification from the host communication terminal. Accordingly, that communication terminal will be not be able to participate in the group communication by transmitting that the communication terminal will participate in the group communication to the host communication terminal in response to a notification of holding of group communication.

However, even in such a case, the communication terminal of a user not registered in the member list of the host communication terminal can transmit that the communication terminal intends to participate in the group communication as a participant communication terminal to the host communication terminal.

Namely, the host communication terminal can receive the fact of intention of participation in the group communication from the communication terminal of a user which is not registered in the member list, so the other party of the communication terminal transmitting that is registered in the member list 109 as explained in (1). Then, it becomes able to allow that communication terminal to participate in group communication in progress at present.

Next, the flow for carrying out the group communication method by communication terminals having the configuration explained above will be explained with reference to the flow chart shown in FIG. 3. Further, it will be explained with reference to FIG. 4 showing the state of registration of the member list 109 of the host communication terminal.

Figure 3:
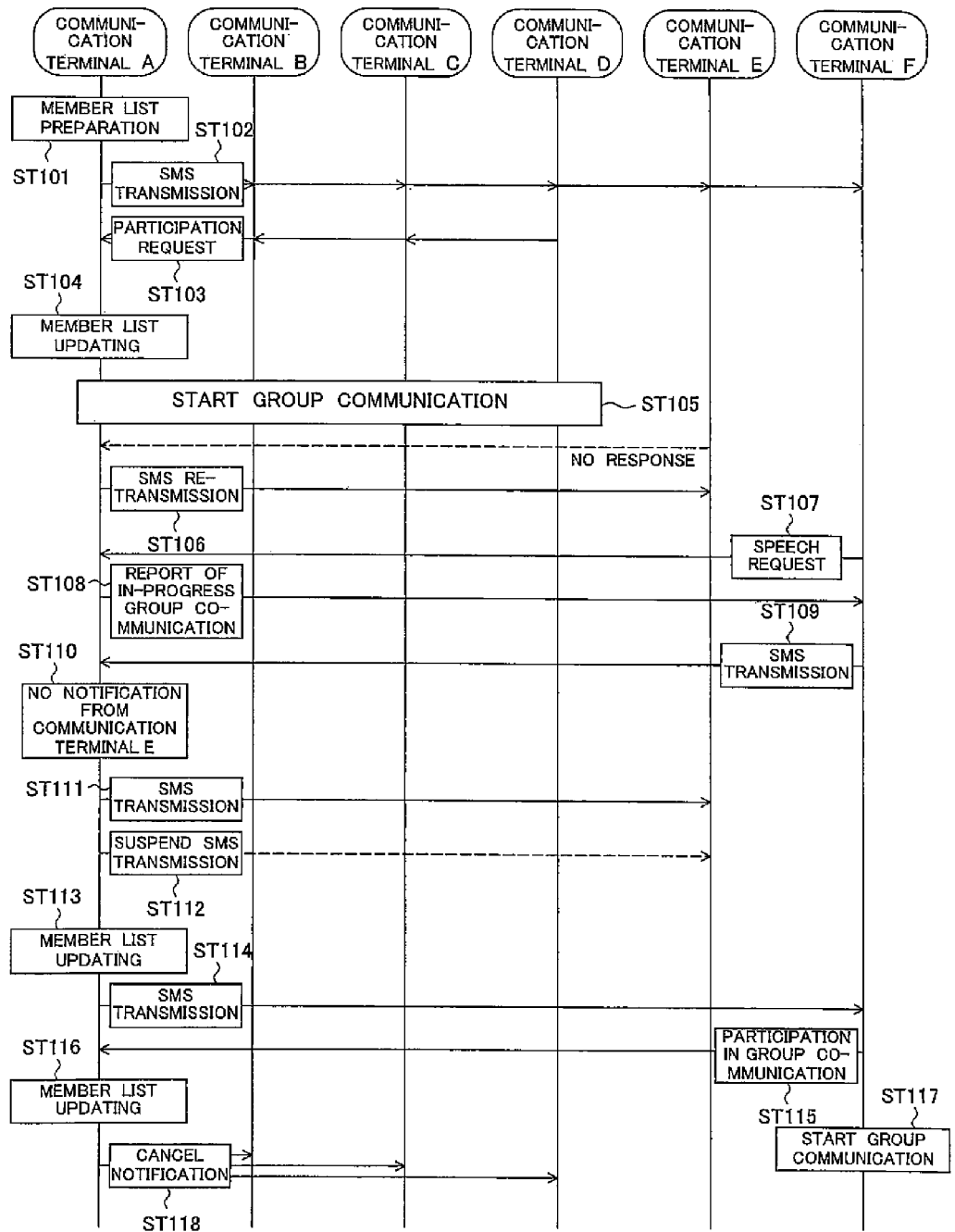
FIG. 3 is a flow chart showing an example of the operation of the communication method according to the present embodiment.

In the example shown in FIG. 3, a communication terminal A is the host communication terminal. A communication terminal B, a communication terminal C, a communication terminal D, a communication terminal E, and a communication terminal F become participant communication terminals or become communication terminals not participating in the group communication. For example, in the present example, the upper limit of the number of communication terminals able to simultaneously engage in the group communications is five.

First, the user of the communication terminal A which becomes the host communication terminal decides it wants to engage in group communication with the users of the communication terminal B, communication terminal C, communication terminal D, and communication terminal E. Then, the user of the communication terminal A operates the key input part of the communication terminal A, whereby the control part of the communication terminal A reads out the information of the users of the communication terminal B, communication terminal C, communication terminal D, and communication terminal E among the information of users of the communication terminal B, communication terminal C, communication terminal D, communication terminal E, and communication terminal F managed in the memory part.

At this time, in the member list of the memory part of the communication terminal A, users of the communication terminal B, communication terminal C, communication terminal D, and communication terminal E are registered as other parties to engage in group communication with the user of the communication terminal A. In this way, the member list is prepared (step ST101). As shown in FIG. 4A, in the prepared member list, users of the communication terminal B, communication terminal C, communication terminal D, and communication terminal E are registered.

After the member list is prepared at step ST101, the communication terminal A transmits requests soliciting participation in the group communication to the communication terminal B, communication terminal C, communication terminal D, and communication terminal E as the other parties for group communication. In the present example, the communication terminal A transmits the requests for participation by SMS to the communication terminal B, communication terminal C, communication terminal D, and communication terminal E (step ST102). This SMS includes the data of the information of the group communication management use site (network address, log-in use ID, etc.) necessary for the participation of the communication terminal B, communication terminal C, communication terminal D, and communication terminal E in the group communication.

In the present example, it is assumed that among the users of the communication terminal B, communication terminal C, communication terminal D, and communication terminal E receiving requests soliciting participation in the group communication, the users of the communication terminal B, communication terminal C, and communication terminal D decide to participate in the group communication. Then, the communication terminal B, communication terminal C, and communication terminal D respond to the communication terminal A that they will participate in the group communication in response to the requests soliciting participation in the group communication (step ST103).

The communication terminal A transmits the SMS to the communication terminal B, communication terminal C, communication terminal D, and communication terminal E at step ST102. However, the terminals actually responding that they will participate in the group communication are the communication terminal B, communication terminal C, and communication terminal D. Therefore, the communication terminal A updates the state of registration of the member list (step ST104). As shown in FIG. 4B, in the member list of the communication terminal A, the communication terminal B, communication terminal C, and communication terminal D are registered. Note that the communication terminal E which did not respond is handled as standing by.

At step ST104, after updating the state of registration of the member list, the terminal A starts the group communication with the terminal B, terminal C, and terminal D (step ST105).

The communication terminal E has received the request soliciting participation in the group communication, but does not respond that it will participate in the group communication. Namely, the communication terminals to which the communication terminal A transmitted the participation request at step ST102 are the communication terminal B, communication terminal C, communication terminal D, and communication terminal E. However, one of the parties among those communication terminals, that is, the communication terminal E, has become the state of "party not participating" in the group communication. However, the communication terminal E is handled as the standby state in the communication terminal A, therefore sometimes the user of the communication terminal E will intend to participate in the group communication in the middle. Therefore, the communication terminal A re-transmits the request for participation in the group communication to the communication terminal E. In the present example, the communication terminal A re-transmits the SMS to the communication terminal E (step ST106).

Further, the user of the communication terminal A initially decides to allow the users of the communication terminal B, communication terminal C, communication terminal D, and communication terminal E to participate in the group communication. For this reason, the group communication is started in a state where the request for participation in the group communication is not transmitted from the communication terminal A to the communication terminal F.

Since the request for participation in the group communication is not transmitted to the communication terminal F, the user of the communication terminal F does not know of the group communication in progress, but may request speech to the communication terminal A (step ST107). Further, sometimes the user of the communication terminal F will not know of the group communication in progress, but will intend to participate in group communication with the user of the communication terminal A. The communication terminal A is informed of a received call from the communication network even when it is in the middle of group communication, therefore once leaves the group communication. The group communication itself is maintained by the communication between the server and the communication terminals, therefore the communication terminal A is kept connected even if it temporarily leaves. Then, the communication terminal A disconnects from the call from the communication terminal F without speaking. Here, it is possible to cut the call after receiving it and issuing a message indicating that the receiver cannot speak. Then, the communication terminal A notifies the communication terminal F that group communication is already underway (step ST108) so as to report group communication in progress. Note that the notification indicating group communication in progress to the communication terminal F which is transmitted at step ST108 preferably has a content confirming with the communication terminal F if it intends to participate in the group communication if the maximum number of group communication terminals have not yet participated.

When the user of the communication terminal F already receiving the report of group communication in progress from the communication terminal A at step ST108 intends to participate in the group communication in answer to the report, a message indicating the intention of participation is transmitted from the communication terminal F to the communication terminal A. In the present example, the communication terminal F transmits a participation intention SMS to the communication terminal A (step ST109). The processing at step ST109 may be comprised as follows as well. Namely, if a notification of content confirming whether or not the communication terminal F intends to participate in the group communication is received at step ST108, the control part of the communication terminal F displays this confirmation content to prompt the user of the communication terminal F to select intend/not intend. Here, if the control part of the communication terminal F transmits the participation intention SMS to the communication terminal A when "intend" is selected and contacts the communication terminal A that it dose not intend to participate in the group communication when "not intend" is selected, the communication terminal A does not have to perform the following processing, therefore it also becomes possible to allow the communication terminal E to participate in a case where the user changes his mind and no longer participates.

The communication terminal A of the host communication terminal has received the intention in participation from the communication terminal F, therefore the communication terminal A can recognize that the communication terminal F intends to participate in the group communication. However, in the communication terminal A, the communication terminal E is handled as in the standby state, and it is assumed that the user of the communication terminal E intends to participate in the group communication in the middle. Irrespective of the communication terminal F issuing the intention of participation, the communication terminal A continuously handles the communication terminal E as in the standby state. Then, if the communication terminal E is allowed to participate in the group communication after that, the number of the communication terminals will becomes five or the upper limit of the communication terminals able to simultaneously engage in the group communication, therefore the communication terminal F will become unable to participate in the group communication.

Therefore, the communication terminal A checks presence/absence of the participation intention from the communication terminal E handled as standing by again (judges the response in communication). When judging no participation intention from the communication terminal E (step ST110), the communication terminal E is handled as not participating in the group communication, and the communication terminal A transmits the SMS indicating impossibility of participation in group communication to the communication terminal E (ST111). By performing this, an empty slot can be secured in the maximum participation limit of the group communication, therefore the communication terminal F becomes able to participate in the group communication from the middle. Further, the communication terminal A no longer re-transmits the request of participation in group communication to the communication terminal E so that the intention of participation will not come from the communication terminal E from them on. In the present example, the communication terminal A does not re-transmit the SMS of the participation request to the communication terminal E (step ST112). When receiving a participation impossibility notification of group communication at step ST111, the control part of the communication terminal E tries to match this with the start notification of group communication received before (concretely compares parameters such as the ID of the group communication, transmitter, and server address designated in each notification) and limits processing so as to not connect even when the user makes an access request to the group communication server based on the matching start request of group communication received in the past.

The communication terminal A no longer re-transmits the SMS to the communication terminal E by step ST112, therefore the communication terminal E no longer can participate in the group communication from then on. Therefore, the registration of the communication terminal E which has not participated in the group communication is deleted from the member list of the communication terminal A. Then, since the communication terminal F intends to participate in the group communication, the communication terminal F is added in the member list of the communication terminal A and handled as standing by (step ST113). Namely, as shown in FIG. 4C, in the member list of the communication terminal A, the communication terminal E is deleted, and the communication terminal F is registered as standing by.

The communication terminal A handling the communication terminal F as standing by transmits a request soliciting participation in the group communication to the communication terminal F. In the present embodiment, the communication terminal A transmits the SMS to the communication terminal F (step ST114). This SMS includes the data of the information of the group communication management use site (network address, log-in use ID, etc.) necessary for the communication terminal F to participate in the group communication.

The communication terminal F receiving the transmission soliciting participation in the group communication from the communication terminal A has already transmitted its intention of participation to the communication terminal A in step ST109. For this reason, when receives the SMS from the communication terminal A at step ST114, the communication terminal F participates in the group communication (step ST115). When participates in the group communication, the communication terminal F participates based on the data of the information of the group communication management use site (network address, log-in use ID, etc.) necessary for participating in the group communication which was sent from the communication terminal A to the communication terminal F at step ST111.

Then, the group communication is carried out by the communication terminal A, communication terminal B, communication terminal C, and communication terminal F (step ST117). At this time, the communication terminal A updates the state of registration of the member list (step ST116). Namely, as shown in FIG. 4D, in the member list of the communication terminal A, the communication terminal B, communication terminal C, communication terminal D, and communication terminal E are registered.

Note that the fact that the communication terminal E will no longer participate in the group communication from then on and that the communication terminal F has participated in the group communication is recognized by only the communication terminal A and communication terminal F as terminals of the related parties. For this reason, at step ST116, after the updating of the state of registration of the member list ends, it is necessary to enable the terminal B, terminal C, and terminal D other than the communication terminal A and communication terminal F to recognize that fact. Therefore, the communication terminal A notifies (updates) the communication terminal B, communication terminal C, and communication terminal D that it has cancelled future group communication participation of the communication terminal E and that the communication terminal F has newly participated in the group communication (step ST118).

As explained above, according to the explanation of the present invention, the member list is recorded and held in the communication terminal A of the host, but this may be updated so that it is recorded and held in the server apparatus of the group communication as well. In this case, this can be realized by the control part of the communication terminal A separately transmitting a notification requesting updating to the server apparatus in each step of updating the member list and notifying that update content.

Further, the point of each control part of each communication terminal receiving and transmitting notifications at each step was mainly shown as an embodiment of the present invention. However, the invention is not limited to this. Preferably the control part of each communication terminal generates and displays a display screen at the display portion of each communication terminal in order to notify the reception of notification, change of participating members, etc. to the user whenever a notification is received or the member list is updated.

Above, embodiments of the present invention were explained with reference to a mobile phone, but the invention is not limited to this. Needless to say the present invention can also be applied to a PHS (Personal Handy Phone System), personal computer, PDA, portable game machine, car navigation system, etc. so far as these have group communication functions.

The invention claimed is:
1. A group communication method of communication terminals by which a plurality of communication terminals connected to a communication network including a communication server apparatus engage in group communication via the communication server apparatus, comprising:
   a personal information management step of managing personal information for communication terminals of a plurality of communicating parties;
   a participation request transmission step of registering a plurality of communication terminals for engaging in the group communication in a member list and transmitting participation requests for the group communication to the plurality of communication terminals when designating a plurality of communication terminals, to engage in the group communication based on the plurality of personal information and starting the group communication;
   a group communication control step of performing processing for the group communication with communication terminals to which responds of participate with respect to the participation requests exist;
   a participation intention reception step of receiving intention to participate in the group communication from another communication terminal to which no participation request has been transmitted, in a state of "party not participating" in which there is at least one communication terminal among the plurality of communication terminals sent the participation requests which will not participate in the group communication; and
   an other party updating step of deleting any communication terminal not participating in the group communication from the member list when receiving the participation intentions in the group communication, in the participation intention reception step, and registering the other party of the other communication terminal in the member list as another party for engaging in group communication, to enable the other communication terminal to participate in the group communication.

2. A group communication method as set forth in claim 1, wherein the method
   further comprises an in-progress group communication report step of responding with a notification of in-progress group communication to another communication terminal when receiving another request of communication from the other communication terminal during the group communication, and
   the participation intention from the other communication terminal is received as an answer to the notification of the in-progress group communication.

3. A group communication method as set forth in claim 1, wherein the method further comprises:
   a re-transmission step of re-transmitting a participation request to any communication terminal which did not respond to the participation request, in the participation request transmission step; and
   an in-progress communication response judgment step of judging presence/absence of a response with respect to a participation request including one re-transmitted during the group communication, and
   in the in-progress communication response judgment step, a state judged as "no response" is judged as the state of "party not participating" in the other party updating step.

4. A group communication method as set forth in claim 1, wherein the method further comprises an update notification step of notifying updating of the member list to the communication terminals participating in the group communication when the other party updating step is executed.

5. A group communication method as set forth in claim 1, wherein
   the group communication has an upper limit in the number of communication terminals capable of participating in the group communication, and the other party updating step is executed in a case where the number of communication terminals participating in the group communication has become the upper limit.

6. A group communication terminal having a communication part for engaging in group communication via a communication server apparatus with a plurality of communication terminals connected to a communication network including the communication server apparatus, comprising:

a personal information management part managing personal information of the plurality of communication terminals; and a group communication control part registering a plurality of other parties engaging in the group communication in a member list and making the communication part transmit participation requests for group communication to the plurality of communication terminals when designating the plurality of communication terminals, to engage in the group communication based on the plurality of personal information and starting the group communication by the communication part, wherein, when the communication part receives participation intention in the group communication from another communication terminal to which no participation request has been transmitted in the state of "party not participating" in which at least one communication terminal among the plurality of communication terminals sent the participation requests does not participate in the group communication, the group communication control part deletes the at least one party of communication from the member list and registers the other communication terminal as the communication terminal, to engage in the group communication in the member list and thereby allows the other communication terminal to participate in the group communication.

7. A group communication terminal as set forth in claim 6, wherein the group communication control part responds with a notification of in-progress group communication to another communication terminal when receiving another request of communication from the other communication terminal during the group communication, and receives participation intention as an answer to the notification of the in-progress group communication from the other communication terminal.

8. A group communication terminal as set forth in claim 6, wherein the group communication control part re-transmits the participation request to any communication terminal not responding to the participation request in the participation request transmission step, judges presence/absence of a response to the participation request including the request re-transmitted during the group communication, and determines the state judged as "no response" in the in-progress communication response judgment processing as the state of "party not participating" in the other party updating step.

9. A group communication terminal as set forth in claim 6, wherein the group communication control part notifies the updating of the member list to the communication terminals participating in the group communication when the other party updating step is executed.

10. A group communication terminal as set forth in claim 6, wherein:

the number of communication terminals capable of participating in the group communication has an upper limit, and the group communication control part executes the other party update processing in a case where the number of communication terminals participating in the group communication has become the upper limit.

* * * * *